United States Patent
Adams (10) Patent No.: US 8,020,116 B2
(45) Date of Patent: Sep. 13, 2011

(54) SYSTEM AND METHOD FOR VISUALIZING A MULTI-SCREEN WORKSPACE ON A SINGLE DISPLAY SCREEN

(75) Inventor: James Adams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 655 days.

(21) Appl. No.: 12/098,920

(22) Filed: Apr. 7, 2008

(65) Prior Publication Data

US 2009/0254854 A1 Oct. 8, 2009

(51) Int. Cl.
*G06F 3/048* (2006.01)

(52) U.S. Cl. .......................................... 715/788

(58) Field of Classification Search .................. 715/764, 715/788, 792, 793, 798, 799, 800
See application file for complete search history.

(56) References Cited

U.S. PATENT DOCUMENTS

| | | | |
|---|---|---|---|
| 5,734,380 A | 3/1998 | Adams et al. | |
| 5,796,403 A | 8/1998 | Adams et al. | |
| 6,008,809 A * | 12/1999 | Brooks | 715/792 |
| 7,191,405 B1 | 3/2007 | Jaramillo | |
| 7,844,917 B2 * | 11/2010 | Rigolet | 715/798 |
| 2002/0054141 A1 * | 5/2002 | Yen et al. | 345/804 |
| 2007/0101289 A1 * | 5/2007 | Awada et al. | 715/784 |

* cited by examiner

*Primary Examiner* — Thanh Vu
(74) *Attorney, Agent, or Firm* — Jetter & Associates, P.A.

(57) ABSTRACT

A system (200) and method (600) for visualizing on a single display screen (SDS) a first plurality of display screen windows (FPDSWs) displayed on display screens (234, ..., 240) of a multi-screen workspace. The method involves determining a relative placement pattern (RPP) for the FPDSWs (250, ..., 272). The method also involves selecting at least one size reduction factor (SRF) to reduce a combined total area of the FPDSW to fit within a viewing area provided by SDS (224). The method further involves displaying a second plurality of display screen windows (SPDSWs) on the SDS using the SRF and RPP. The SPDSWs (250', ..., 272') are presented such that the FPDSWs having a reduced combined total area is simultaneously viewable on the SDS in the RPP. Notably, the SPDSWs can comprise substantially similar content and attributes of respective display screen windows of the FPDSWs.

20 Claims, 7 Drawing Sheets

DISPLAY WINDOW CONFIGURATION FILE 280

DISPLAY SCREEN 234
TOTAL RESOLUTION: 1600 x 1200
LOCATION: TOP LEFT

DISPLAY SCREEN WINDOW 250:
RESOLUTION: 800 x 600
LOCATION: TOP RIGHT
CONTENT/ATTRIBUTE INFORMATION

DISPLAY SCREEN WINDOW 252:
RESOLUTION: 800 x 600
LOCATION: TOP LEFT
CONTENT/ATTRIBUTE INFORMATION

DISPLAY SCREEN WINDOW 254:
RESOLUTION: 800 x 300
LOCATION: BOTTOM RIGHT
CONTENT/ATTRIBUTE INFORMATION

DISPLAY SCREEN WINDOW 256:
RESOLUTION: 800 x 600
LOCATION: BOTTOM LEFT
CONTENT/ATTRIBUTE INFORMATION

DISPLAY SCREEN 236
TOTAL RESOLUTION: 1600 x 1200
LOCATION: TOP RIGHT

DISPLAY SCREEN WINDOW 258:
RESOLUTION: 1600 x 600
LOCATION: TOP
CONTENT/ATTRIBUTE INFORMATION

DISPLAY SCREEN WINDOW 260:
RESOLUTION: 1600 x 600
LOCATION: BOTTOM
CONTENT/ATTRIBUTE INFORMATION

DISPLAY SCREEN 238
TOTAL RESOLUTION: 1600 x 1200
LOCATION: BOTTOM LEFT

DISPLAY SCREEN WINDOW 258:
RESOLUTION: 1600 x 600
LOCATION: TOP
CONTENT/ATTRIBUTE INFORMATION

DISPLAY SCREEN WINDOW 260:
RESOLUTION: 1600 x 600
LOCATION: BOTTOM
CONTENT/ATTRIBUTE INFORMATION

DISPLAY SCREEN 240
TOTAL RESOLUTION: 1600 x 1200
LOCATION: BOTTOM RIGHT

DISPLAY SCREEN WINDOW 266:
RESOLUTION: 800 x 600
LOCATION: TOP RIGHT
CONTENT/ATTRIBUTE INFORMATION

DISPLAY SCREEN WINDOW 268:
RESOLUTION: 800 x 600
LOCATION: TOP LEFT
CONTENT/ATTRIBUTE INFORMATION

DISPLAY SCREEN WINDOW 270:
RESOLUTION: 800 x 600
LOCATION: BOTTOM RIGHT
CONTENT/ATTRIBUTE INFORMATION

DISPLAY SCREEN WINDOW 272
RESOLUTION: 800 x 600
LOCATION: BOTTOM LEFT
CONTENT/ATTRIBUTE INFORMATION

FROM FIG. 6A

COMPUTE A NEW COMBINED TOTAL AREA FOR THE DSW (W.G., DSWs 250, ..., 272) AND/OR NEW DSW RESOLUTIONS BY MULTIPLYING THE RESOLUTION ROW AND COLUMN VALUES FOR EACH DSW (W.G., DSWs 250, ..., 272) OF THE MSCS BY THE SSRF SELECTED IN THE PREVIOUS STEP 606 OF FIG. 6A (E.G., [NEW DSW$_{250}$ RESOLUTION = 800·0.25 x 600·0.25 = 200 x 150])
616

DETERMINE A RELATIVE PLACEMENT PATTERN FOR THE DSWs (E.G., DSWs 250, ..., 272) USING INFORMATION OBTAINED IN THE PREVIOUS STEP 608 OF FIG. 6A (E.G., LOCATION INFORMATION FOR EACH DSW) AND THE DISPLAY SCREEN AREAS (E.G., DSAs 502, 504, 506, 508) DEFINED IN THE PREVIOUS STEP 614 OF FIG. 6A
618

DISPLAY A SET OF DSWs (E.G., DSWs 250', ..., 272') IN THE RESPECTIVE DISPLAY SCREEN AREA (E.G., DSA 502, 504, 506, 508) ON THE DS (E.G. DS 224) IN ACCORDANCE WITH THE COMBINED TOTAL AREA COMPUTED IN THE PREVIOUS STEP 616, THE NEW DSW RESOLUTIONS COMPUTED IN THE PREVIOUS STEP 616, THE RELATIVE PLACEMENT PATTERN DETERMINED IN THE PREVIOUS STEP 618, AND INFORMATION OBTAINED IN THE PREVIOUS STEP 608 OF FIG. 6A (E.G., CONTENT/ATTRIBUTE INFORMATION FOR EACH DSW), WHEREIN THE DSWs ARE DISPLAYED IN A SUBSTANTIALLY SIMILAR RELATIVE PLACEMENT PATTERN AS A RELATIVE PLACEMENT PATTERN OF THE DSWs OF THE FCS 202
620

END 622

FIG. 6B

SYSTEM AND METHOD FOR VISUALIZING A MULTI-SCREEN WORKSPACE ON A SINGLE DISPLAY SCREEN

BACKGROUND OF THE INVENTION

1. Statement of the Technical Field

The invention concerns a display system. More particularly, the invention concerns a system and method for visualizing a multi-screen workspace on a single display screen.

2. Background

Figure 1:
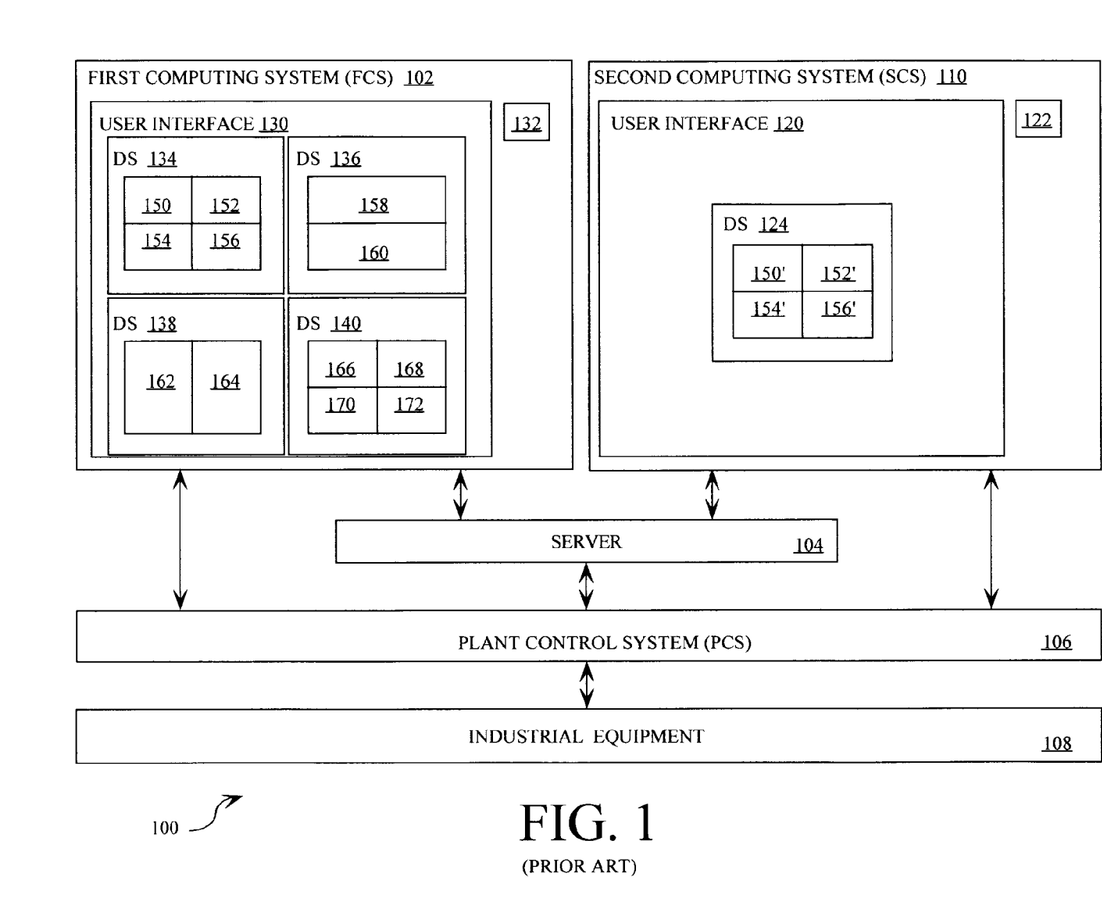
FIG. 1 is a block diagram of a conventional industrial plant control system.

There are many types of industrial plant control systems (IPCS) known in the art for controlling industrial equipment and processes. One such conventional IPCS 100 is shown in FIG. 1. As shown in FIG. 1, the IPCS 100 includes a first computing system (FCS) 102, a second computing system (SCS) 110, a server 104, a plant control system (PCS) 106, and industrial equipment 108. The PCS 106 typically has a distributed network configuration, i.e., there are application specific modules connected to each other, industrial equipment 108, and operator interfaces (not shown) via a local control network (not shown).

The computing systems (CSs) 102, 110 are configured to enable the control of the industrial equipment 108 by an operator (not shown). As such, each of the CSs 102, 110 includes a respective user interface 130, 120 and processing device 132, 122. The user interface 120 of the SCS 110 typically comprises a workspace including a single display screen (DS) 124 having a particular resolution (e.g., 1600 columns of pixels by 1200 rows of pixels). The DS 124 and processing device 122 collectively provide a means to display one or more display windows (e.g., DSWs 150', . . . , 156') to the operator (not shown). The phrase "display window" as used herein refers to a visual area of a display screen configured to display content. The content generally includes one or more of text, graphs, charts, real-time images, digital images, and graphical user interfaces.

In contrast, the user interface 130 of the FCS 102 typically comprises a multi-screen workspace including a plurality of DSs 134, . . . , 140 with particular resolutions (e.g., 1600 columns of pixels by 1200 rows of pixels). The DSs 134, . . . , 140 and the processing device 132 collectively provide a means to display a set of DSWs 150, . . . , 172 to a user (not shown). The user (not shown) is typically an engineer, a supervisor, a manager, and/or an operator.

The DSs 134, . . . , 140 often include different numbers of DSWs 150, . . . , 172 having particular resolutions and relative placement patterns. For example, the DSs 134, 140 include four (4) respective DSWs 150, . . . , 156, 166, . . . , 172 having the same resolution (e.g., 400 columns of pixels by 300 rows of pixels). The relative placement pattern of the DSWs 150, . . . , 156, 166, . . . , 172 can be generally defined by the following expressions: (a) top left $DSW_{150}$, top right $DSW_{152}$, bottom left $DSW_{154}$, bottom right $DSW_{156}$; and (b) top left $DSW_{166}$, top right $DSW_{168}$, bottom left $DSW_{170}$, bottom right $DSW_{172}$. The DSs 136, 138 include (2) respective DSWs 158, . . . , 164. The relative placement pattern of the DSWs 158, 160 can be defined by the following expression: top $DSW_{158}$, bottom $DSW_{160}$. The relative placement pattern of the DSWs 162, 164 can be defined by the following expression: left $DSW_{162}$, right $DSW_{164}$.

Despite the advantages of such a conventional IPCS 100, it suffers from certain drawbacks. For example, a user (not shown) of the SCS 110 can only view a portion (e.g., 25%) of the content displayed in the multi-screen workspace of the FCS 102 on the single DS 124. One can appreciate that this viewing limitation has disadvantageous affects on the results of certain events.

For example, if an error summary is displayed in a lower right corner of a display screen to a first engineer (not shown) of the FCS 102, then the first engineer (not shown) contacts a second engineer present at a different geographic location to determine what actions are necessary to resolve the error or relocate the error summary to an upper left corner of the display screen. However, the second engineer only has access to a single-screen workspace. The single-screen workspace is configured to display a portion (e.g., 25%) of the content (e.g., DSWs 150, . . . , 156) displayed on the multi-screen workspace (as shown in FIG. 1). As a result, the second engineer is unable to easily visualize the multi-screen workspace for understanding its DSW layout, commenting on its DSW layout, determining how to resolve the error in a time efficient manner, and determining how to relocate the error summary. Accordingly, there is a need for an improved IPCS configured to enable the visualization of substantially all of the content of a multi-screen workspace on a single display screen.

SUMMARY OF THE INVENTION

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

The present invention concerns methods (and implementing systems) for visualizing on a single display screen a first plurality of display screen windows (DSWs) displayed on a plurality of display screens of a multi-screen workspace. The method can involve determining a relative placement pattern for the DSWs of the first plurality of DSWs. The method can also involve selecting at least one size reduction factor to reduce a combined total area of the first plurality of DSWs to fit within a viewing area provided by the single display screen. The method can further involve displaying a second plurality of DSWs on the single display screen using the size reduction factor and the relative placement pattern. The second plurality of DSWs is presented such that each DSW of the first plurality of DSWs having a reduced combined total area are simultaneously viewable on the single display screen in the relative placement pattern. Notably, the second plurality of DSWs can comprise the same or similar content and attributes of respective display screen windows of the first plurality of DSWs. The phrase "similar content" as used herein means that a DSW of the second plurality of DSWs has seventy-five percent (75%) or more of the content of a respective DSW of the first plurality of DSWs. The phrase "similar attributes" as used herein means that a DSW of the second plurality of DSWs has at least one attribute as a respective DSW of the first plurality of DSWs.

BRIEF DESCRIPTION OF THE DRAWINGS

Embodiments will be described with reference to the following drawing figures, in which like numerals represent like items throughout the figures, and in which:

FIG. 4 is a block diagram of an exemplary display window configuration file according to an embodiment of the invention.

DETAILED DESCRIPTION

The invention generally concerns methods (and implementing systems) for visualizing a multi-screen workspace on a single display screen. The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing the methods of the present invention, it will be helpful in understanding an exemplary environment in which the invention can be utilized. In this regard, it should be understood that the methods of the present invention can be utilized in any application where a multi-screen workspace is to be displayed on a single display screen. Such applications include, but are not limited to, industrial plant control applications, medical applications, security applications, and navigation applications. Accordingly, the methods of the present invention will now be described in relation to one such application, namely, the industrial plant control application.

Figure 2:
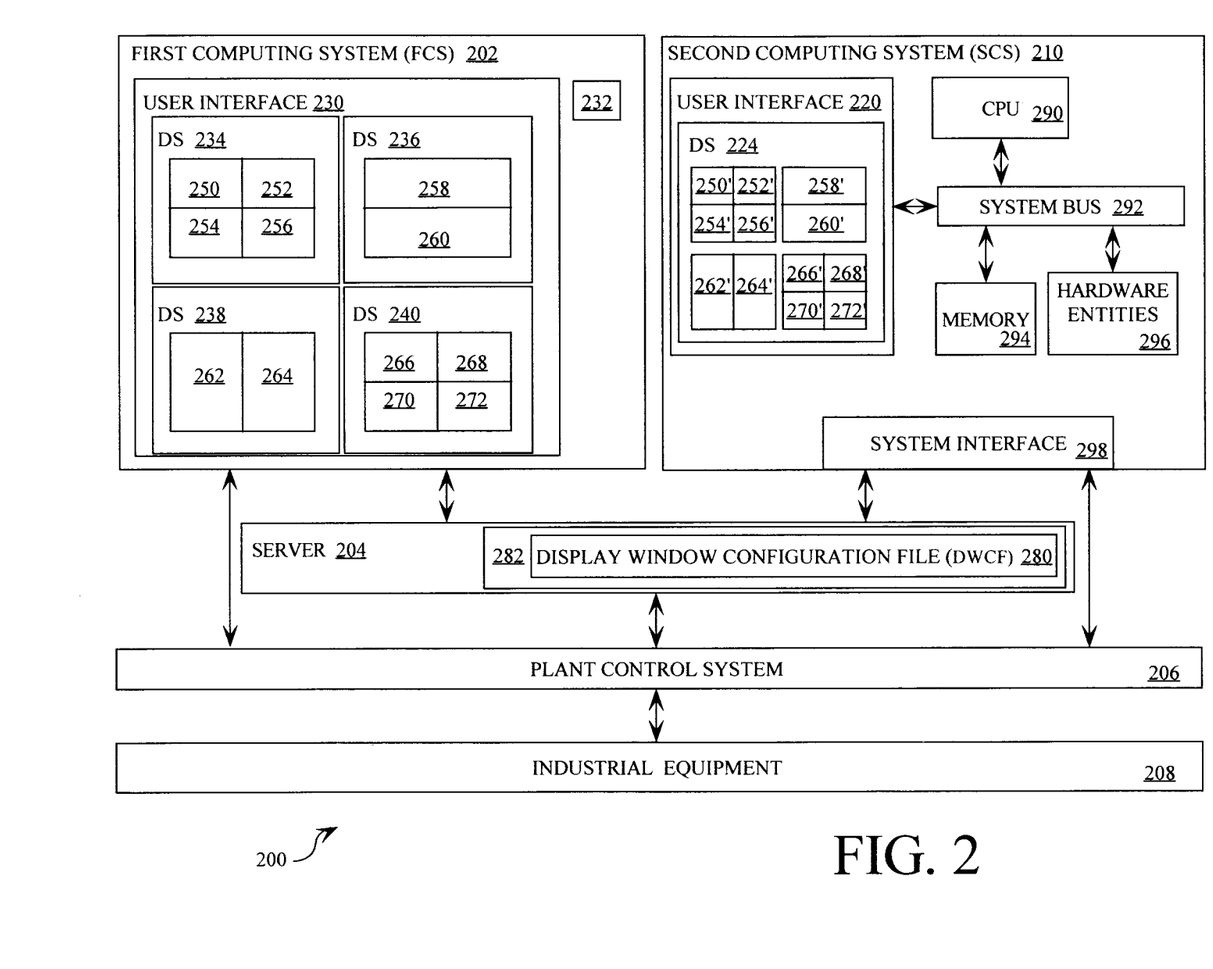
FIG. 2 is a bock diagram of an industrial plant control system according to an embodiment of the invention.

Referring now to FIG. 2, there is provided a block diagram of an industrial plant control system 200 according to an embodiment of the present invention. As shown in FIG. 2, the control system 200 is comprised of a first computing system (FCS) 202, a second computing system (SCS) 210, a server 204, a plant control system (PCS) 206, and industrial equipment 208. The server 204 is configured to perform application specific actions for controlling an industrial process and equipment 208. More particularly, the server 204 and the PCS 206 collectively control industrial equipment 208 associated with an industrial process.

In one non-limiting application, the PCS 206 can be the control system described in U.S. Pat. Nos. 5,796,403 or 5,734,380. In such a scenario, the PCS 206 is generally a distributed control system, i.e., there are application specific modules connected to each other, industrial equipment, and operator interfaces via a local control network. The industrial equipment 208 may generally include gauges, valves, transmitters, actuators, and sensors. The invention is not limited in this regard.

As shown in FIG. 2, the server 204 can be configured to communicate with the computing systems 202, 210 for displaying monitor and/or control information to a user (not shown). The user (not shown) can be an engineer, supervisor, manager, operator, or the like. In this regard, it should be understood that the server 204 is configured to receive information from the computing systems 202, 210 and/or the PCS 206. Such information can include, but is not limited to, display screen (DS) identification information, DS area information, DS resolution information, and DS location information. Such information can also include display screen window (DSW) identification information, DSW area information, DSW resolution information, DSW location information, DSW content information, and DSW attribute information.

According to an embodiment of the invention, the DS identification information can generally include a unique string of letters or numbers associated with a particular DS (e.g., DSs 234, . . . , 240). The DS area information can generally include a string of numbers indicating a total viewable area of the DS. The DS resolution information can generally include a unique string of numbers representing a display screen resolution (described below in relation to FIG. 3) for a particular DS (e.g., DSs 234, . . . , 240). The DS location information can generally include a string of letters or numbers indicating (a) a location of a particular DS (e.g., DSs 234, . . . , 240) relative to other DSs of a multi-screen workspace or (b) a pre-defined region of a multi-screen workspace in which a particular DS (e.g., DSs 234, . . . , 240) exists. The pre-defined regions can include, but are not limited to, a left region, a right region, a top (or upper) region, a bottom (or lower) region, a top (or upper) left region, a top (or upper) right region, a bottom (or lower) left region, a bottom (or lower) right region, a top (or upper) middle region, and a bottom (or lower) middle region. The invention is not limited in this regard.

Similarly, the DSW identification information can generally include a unique string of letters or numbers associated with a particular DSW (e.g., DSW 250, . . . , or DSW 272) displayed on a multi-screen workspace. The DSW area information can generally include a string of numbers indicating a total area of the DSW. The DSW resolution information can generally include a unique string of numbers representing a resolution (described below in relation to FIG. 3) for a particular DSW (e.g., DSW 250, . . . , or DSW 272). The DSW location information can generally include a string of letters or numbers indicating a pre-defined region of a DS (e.g., DS 234, . . . , or DS 240) in which at least one DSW (e.g., DSW 250, . . . , and/or DSW 272) is displayed. The pre-defined regions can include, but are not limited to, a top (or upper) region, a bottom (or lower) region, a left region, a right region, a top (or upper) left region, a top (or upper) right region, a bottom (or lower) left region, a bottom (or lower) right region, a top (or upper) middle region, and a bottom (or lower) middle region. The invention is not limited in this regard.

The DSW content information can generally include one or more of still images, video images, an animated image, text, graphs, charts, data, graphical user interfaces (GUIs), or any other information useful in monitoring an area of interest and/or controlling a desired process. The DSW attribute information can include DSW specification information, such as (a) information indicating whether a particular DSW (DSW 250, . . . , or DSW 272) can be resized by an operator, (b) information indicating whether a particular DSW (DSW 250, . . . , or DSW 272) can be closed, (c) information indicating whether a particular DSW (DSW 250, . . . , or DSW 272) can be minimized, and/or (d) information indicating whether a particular DSW (DSW 250, . . . , or DSW 272) remains visible even when its territory overlaps another DSW.

Referring again to FIG. 2, the server 204 can be comprised of an internal memory device 282 for storing the received information in a display window configuration file (DWCF) 280. A schematic illustration of the DWCF 280 containing received information is shown in FIG. 4. As shown in FIG. 4, the received information can be stored in the DWCF 280 according to a format (e.g., a table format) selected in accordance with a particular application. The invention is not limited in this regard. For example, the DWCF 280 can alternatively be stored in each of the computing systems 202, 210. In such a scenario, the computing system 202, 210 may or may not communicate information to the server 204 for storage. It should be noted that the DWCF 280 is shown in FIG. 4 to be absent of DS and DSW area information. This lack of area information is for simplicity purposes. The invention is not limited in this regard.

Referring again to FIG. 2, the FCS 202 can be a desktop personal computer system having a multi-screen workspace, a mobile computing device having a multi-screen workspace, or any other general purpose computer processing device having a multi-screen workspace. As such, the FCS 202 is comprised of a user interface 230 and a processing device 232. The user interface 230 is comprised of the multi-screen workspace including a plurality of DSs 234, ..., 240. Although the user interface 230 shown in FIG. 2 comprises four (4) display screens, the invention is not limited in this regard. The user interface 230 can have any number of display screens selected in accordance with a particular FCS 202 application.

The DSs 234, ..., 240 and the processing device 232 collectively provide a means to display a set of DSWs 250, ..., 272 to the operator (not shown). Although the DSs 234, ..., 240 collectively comprise twelve DSWs, the invention is not limited in this regard. Each of the DSs 234, ..., 240 can comprise any number of DSWs selected in accordance with a particular multi-screen workspace application.

Each of the DSWs 250, ..., 272 can include the same or different content. The content generally includes, but is not limited to, still images, video images, an animated image, text, graphs, charts, data, graphical user interfaces (GUIs), or any other information useful in monitoring an area of interest and/or controlling a desired process. In an industrial process scenario, the GUIs can contain information necessary for enabling an operator (not shown) to monitor and/or control an industrial process or equipment. Such information includes, but is not limited to, real-time images of a particular area of an industrial plant, data indicating temperature of a liquid used in an industrial process, and data indicating how much liquid is in a particular container.

Each of the DSs 234, ..., 240 can have the same or different resolution. A resolution of DS 234 according to an embodiment of the invention will now be described in relation to FIG. 3. However, it should be understood that the display screen resolutions for the DSs 236, ..., 240 can be the same as or substantially similar to the display screen resolution of the DS 234. As such, the description of the display screen 234 resolution is sufficient for understanding the display screen resolutions of the DSs 236, ..., 240.

Figure 3:
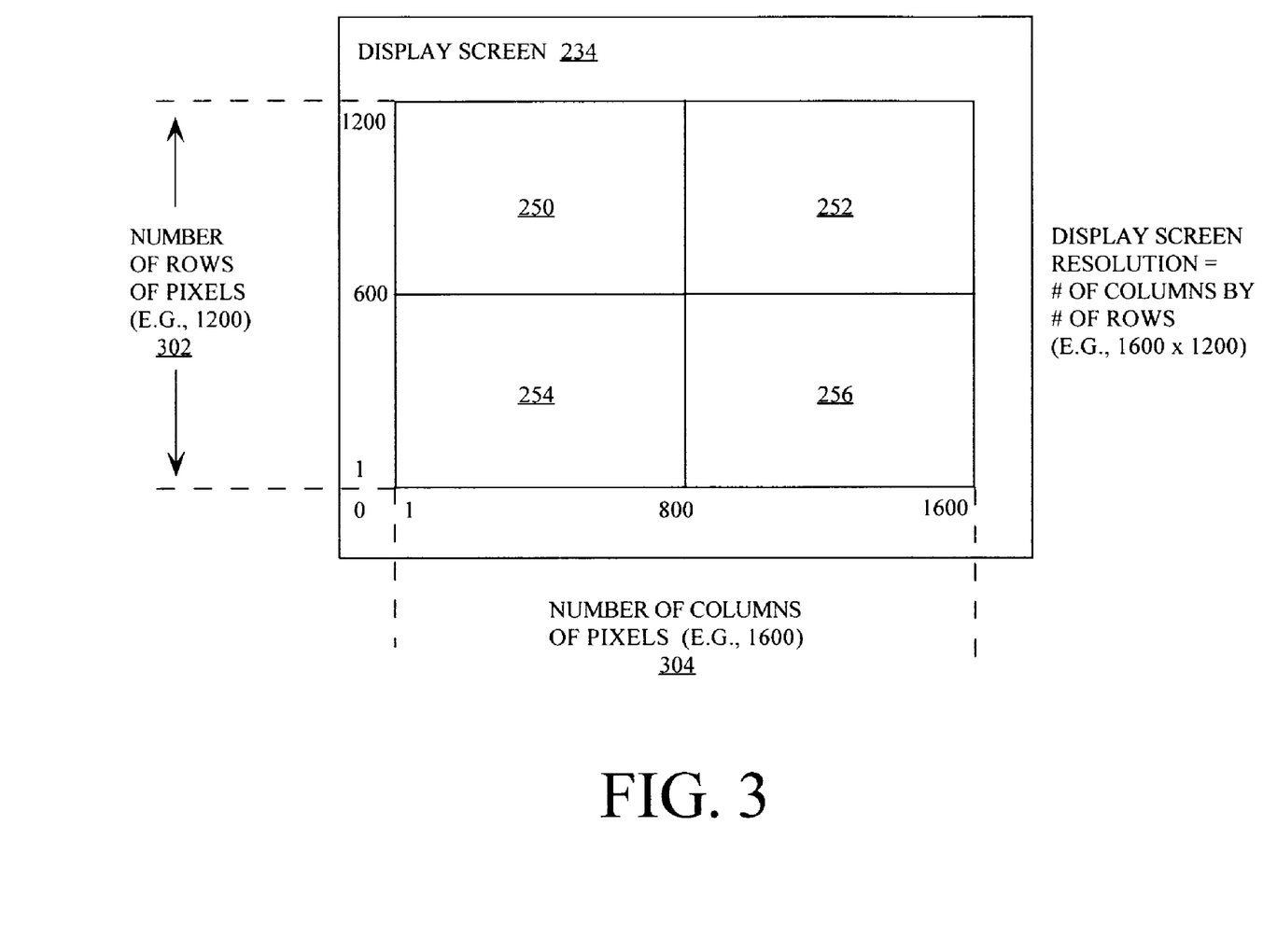
FIG. 3 is a block diagram of an exemplary display screen according to an embodiment of the invention having a particular resolution.

As shown in FIG. 3, the DS 234 has a display screen resolution defined by the following mathematical equation $DSR = N_C$ by $N_R$, where DSR represents a resolution of a display screen, $N_C$ represents the number of columns of pixels creating a display screen, and $N_R$ represents the number of rows of pixels creating a display screen.

According to a particular embodiment of the invention, the DS 234 has a display screen resolution of $DSR = N_C$ by $N_R = 1600$ by 1200. The DS 234 also contains four (4) DSWs 250, ..., 256 having the same resolution. In such a scenario, each of the DSWs 250, ..., 256 has a resolution defined by the following mathematical equation $DSWR = N_C'$ by $N_R'$, where DSWR represents a resolution of a display screen window, $N_C'$ represents the number of columns of pixels creating a display screen window, and $N_R'$ represents the number of rows of pixels creating a display screen window. More particularly, each of the DSWs 250, ..., 256 has a resolution defined as DSWR=800 by 300. The invention is not limited in this regard.

Referring again to FIG. 2, each of the DSs 234, ..., 240 can generally include a different number of DSWs 250, ..., 272 having particular resolutions, areas, and relative placement patterns. For example, the DSs 234, 240 include four (4) respective DSWs 250, ..., 256, 266, ..., 272 having the same resolutions (e.g., 800 by 600) and areas. The relative placement pattern of the DSWs 250, ..., 256, 266, ..., 272 can be defined by the following expressions: (a) top left $DSW_{250}$, top right $DSW_{252}$, bottom left $DSW_{254}$, bottom right $DSW_{256}$; and (b) top left $DSW_{266}$, top right $DSW_{268}$, bottom left $DSW_{270}$, bottom right $DSW_{272}$. The DSs 236, 238 include (2) respective DSWs 258, ..., 264. The DSWs 258, 260 have the same resolutions (e.g., 1600 by 600) and areas. Similarly, the DSWs 262, 264 have the same resolutions (e.g., 800 by 1200) and areas. The relative placement pattern of the DSWs 258, 260 can be defined by the following expression: top $DSW_{158}$ and bottom $DSW_{160}$. The relative placement pattern of the DSWs 162, 164 can be defined by the following expression: left $DSW_{162}$ and right $DSW_{164}$. The invention is not limited in this regard.

The SCS 210 can be a desktop personal computer system, a laptop personal computer system, a personal digital assistant, a mobile computing device, or any other general purpose computer processing device. As such, the SCS 210 is comprised of a system interface 298, a user interface 220, a central processing unit 290, a system bus 292, a memory 294 connected to and accessible by other portions of the SCS 210 through the system bus 292, and hardware entities 296 connected to the system bus 292. At least some of the hardware entities 296 perform actions involving access to and use of the memory 294, which for example may be a random access memory (RAM), a disk driver, and/or a compact disc read only memory (CD-ROM).

The system interface 298 allows the SCS 210 to communicate directly or indirectly with the server 204 and PCS 206. If the system interface 298 is communicating indirectly with the server 204 and/or PCS 206, then the SCS 210 is sending and receiving communications through a network (not shown). The network (not shown) can be a wireless network such as a local area network, a wide area network, or a personal area network.

The hardware entities 296 may include microprocessors, application specific integrated circuits (ASICs), or other hardware. For example, the hardware entities 296 may include a microprocessor programmed for communicating with a server 204. More particularly, the hardware entities 296 may include a microprocessor programmed for accessing a memory 282 of the server 204, reading data from the memory 282, and writing data to the memory 282. The hardware entities 296 may also include a microprocessor configured to perform at least a portion of a method for visualizing a multi-screen workspace on a single display screen. Such a method will be described below in relation to FIGS. 6A-6B.

In this regard, it should be understood that the hardware entities 296 may include a microprocessor generally configured to compute new resolutions for the DSs 234, ..., 240, compute new viewable areas for the DSs 234, ..., 240, determine relative placement patterns for the DSs 234, ..., 240, compute new resolutions for DSWs 250, ..., 272, compute new dimensions for the DSWs 250, ..., 272, compute new areas for the DSWs 250, ..., 272, and/or determine relative placement patterns for the DSWs 250, ..., 272. The microprocessor can also be configured to define DS areas (described below in relation to FIG. 5) of a DS 224 and perform data compression operations. Data compression operations are well known to those having ordinary skill in the art, and therefore will not be described herein.

The microprocessor can further be configured to display a set of DSWs 250', ..., 272' that have the same or similar content and/or attribute information as the DSWs 250, ..., 272, respectively. As noted above, the phrase "similar content" as used herein means that a DSW of the second plurality of DSWs has seventy-five percent (75%) or more of the content of a respective DSW of the first plurality of DSWs. As also noted above, the phrase "similar attributes" as used herein means that a DSW of the second plurality of DSWs has at least one attribute as a respective DSW of the first plurality of DSWs. The DSWs 250', ..., 272' can also be displayed in a relative placement pattern that is the same as or similar to the relative placement pattern of the DSW 250, ..., 272 (as shown in FIG. 2). The DSWs 250', ..., 272' can further have lower resolutions than the DSWs 250, ..., 272, respectively. The lower resolutions can be determined (or computed) using the resolutions of the DSWs 250, ..., 272.

The user interface 220 is generally comprised of input devices, output devices, and software routines configured to allow a user to interact with and control software applications installed on the SCS 210. Such input and output devices include, but are not limited to, a display screen 224, a speaker (not shown), a keypad (not shown), a directional pad (not shown), a directional knob (not shown), and a microphone (not shown). As such, the user interface 220 can facilitate user-software interaction for communicating with a server 204. The user interface 220 can also facilitate user-software interaction for selecting a screen size reduction factor (SSRF) from a menu displayed on the DS 224. The menu can be a user selectable menu that includes a plurality of SSRFs. Alternatively, the SSRF(s) can be automatically computed by the SCS 210.

According to an embodiment of the invention, the SSRF can be automatically computed based on the ascertained resolution of the display screen 224. The ascertained resolution includes an x-resolution value and y-resolution value. The SSRF is automatically computed by determining the ratio of the display screen's 224 x-resolution value to a combined width of a given display screen (e.g., DS 250, ..., 272) layout ascertained from a multi-screen workspace configuration file. Similarly, SSRF is automatically computed by determining the ratio of the display screen's 224 y-resolution to a combined height of a given display screen (e.g., DS 250, ..., 272) layout ascertained from a multi-screen workspace configuration file. Thereafter, the smaller of the two computed ratios is selected as the SSRF.

For example, a two-display screen horizontal workspace is defined by two 1600 by 1200 resolution physical display screens. The contents of the two display screens is to be deployed on a single 1600 by 1200 resolution display screen. As such, an SSRF can be automatically computed. The SSRF automatic computation involves determining a total width (extreme right minus, extreme left coordinates) of the two-display screens (e.g., total width=1600·2=3200). The SSRF automatic computation also involves workspace determining a total height of the two-display screen (e.g., total height=1200). Thereafter, ratios are computed using the computed total width and height. More particularly, a ratio of the single display screen's x-resolution value (e.g., 1600) to the total width (e.g., 3200) is computed (e.g., ratio=1600/3200=0.5). Similarly, a ratio of the single display screen's y-resolution value (e.g., 1200) to the total height (e.g., 1200) is computed (ratio=1200/1200=1.0). In such a scenario, the SSRF is 0.5, i.e., the lowest ratio value. The invention is not limited in this regard.

Referring again to FIG. 2, the SSRFs can be stored in an internal memory 294 of the SCS 210 and/or in an external memory (e.g., memory 282 of a server 204). If the SSRFs are stored in an internal memory (e.g., memory 294), then the SSRFs can be stored in the internal memory and read from the internal memory regardless of any configuration file that may describe a multi-screen workspace. Alternatively, if the SSRFs are stored in the external memory, then the SSRFs can be stored in a configuration file (e.g., DWCF 280) and read from the configuration file.

According to an embodiment of the invention, each SSRF can be a variable for use in reducing a combined total area of the DSs 234, ..., 240 and/or DSWs 250, ..., 272. Each SSRF can also be a variable for use in computing new resolutions for the DSs 234, ..., 240 of a mulit-screen workspace and/or DSWs 250, ..., 272 displayed on respective DSs 234, ..., 240. The variable can generally be any percentage variable, such as fifteen percent (15%), twenty-five percent (25%), fifty percent (50%), seventy-five percent (75%), and one hundred percent (100%). A percentage variable of one hundred percent (100%) can represent a full, multi-screen size (or resolution). A percentage variable of fifty percent (50%) can represent half of a multi-screen size (or resolution), and so on. The invention is not limited in this regard.

Referring again to FIG. 2, the DS 224 can have a particular resolution and viewable area. For example, the DS 224 has a resolution of sixteen hundred columns of pixels by twelve hundred rows of pixels (1600 by 1200). The invention is not limited in this regard. The DS 224 can have any resolution and viewable area selected in accordance with a particular SCS 210 application. The DS 224 and hardware entities 296 collectively provide a means to display one or more DSWs 250', ..., 272' to an operator (not shown).

Figure 5:
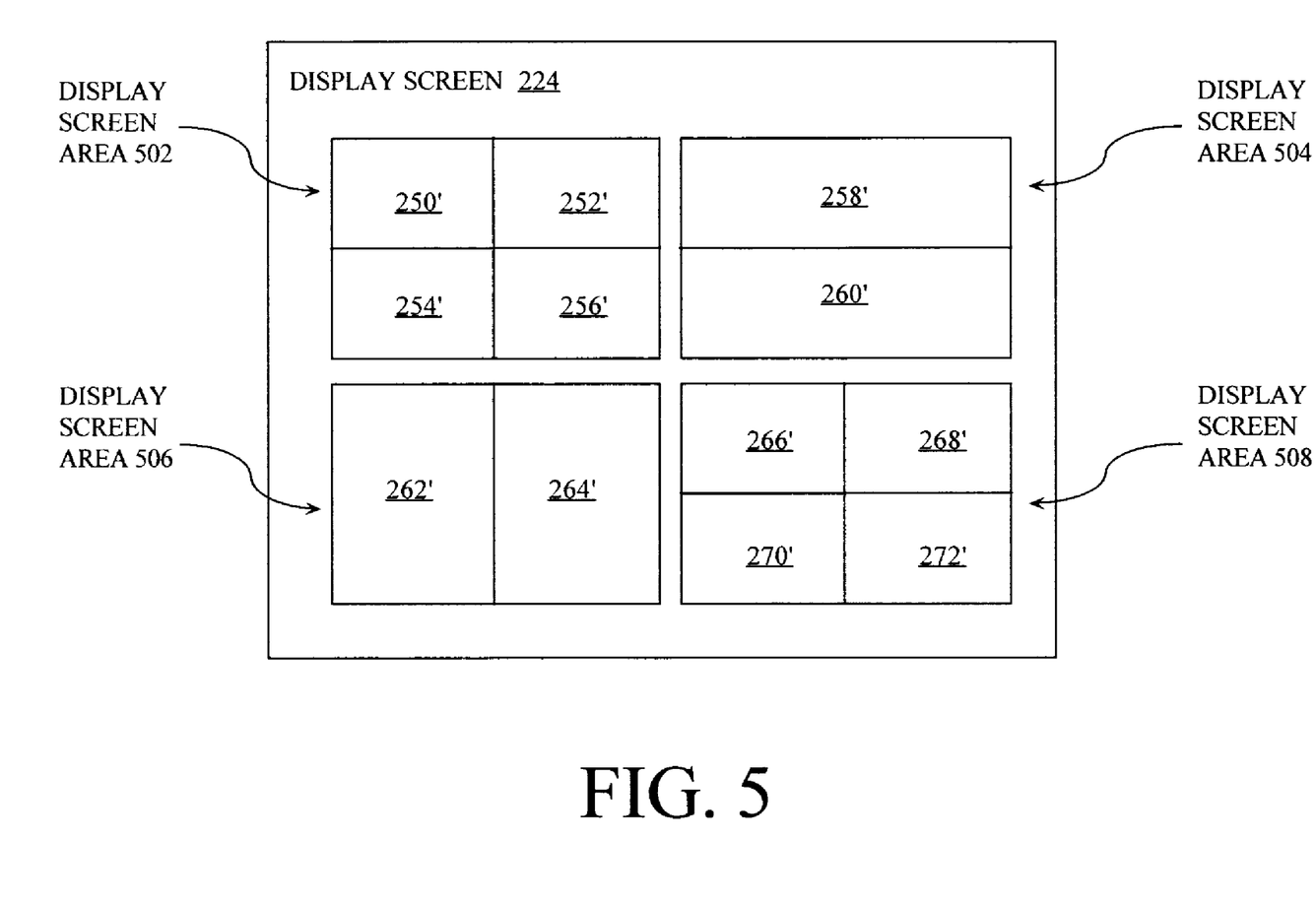
FIG. 5 is a block diagram of a display screen window having a plurality of display screen areas, according to an embodiment of the invention.

Referring now to FIG. 5, the DS 224 can include a plurality of display screen areas (DSAs) 502, ..., 508. Each of the DSAs 502, ..., 508 can be associated with a particular DS 234, ..., 240 of the FCS 202. For example, DSA 502 is shown associated with a DS 234. Similarly, the DSA 504 is shown associated with a DS 236. Likewise, each of the DSAs 506, 508 is shown associated with a respective DS 238, 240. The phrase "associated with" as used here means that a particular DSA 502, ..., 508 is provided for displaying the same or similar content of respective DSWs displayed on a particular DS 234, ..., 240. As such, the content will advantageously appear on the DS 224 in the same or similar configuration (or placement pattern) as the content presented on the multi-screen workspace of the FCS 202 (as shown in FIG. 5). The invention is not limited in this regard.

Figure 6A:
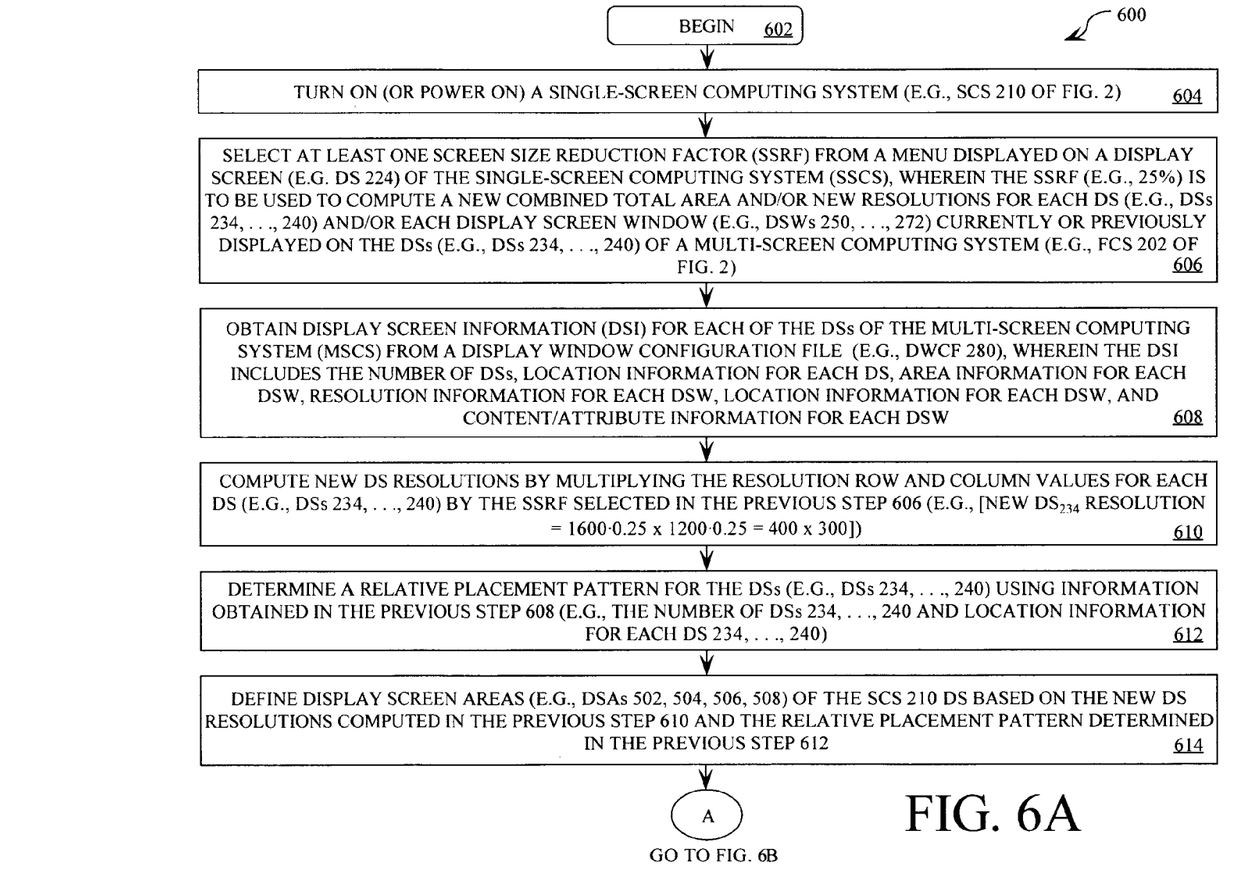
FIGS. 6A-6B collectively provide a flow diagram of a method for visualizing a multi-screen workspace on a single display screen, according to an embodiment of the invention.
Figure 6B:
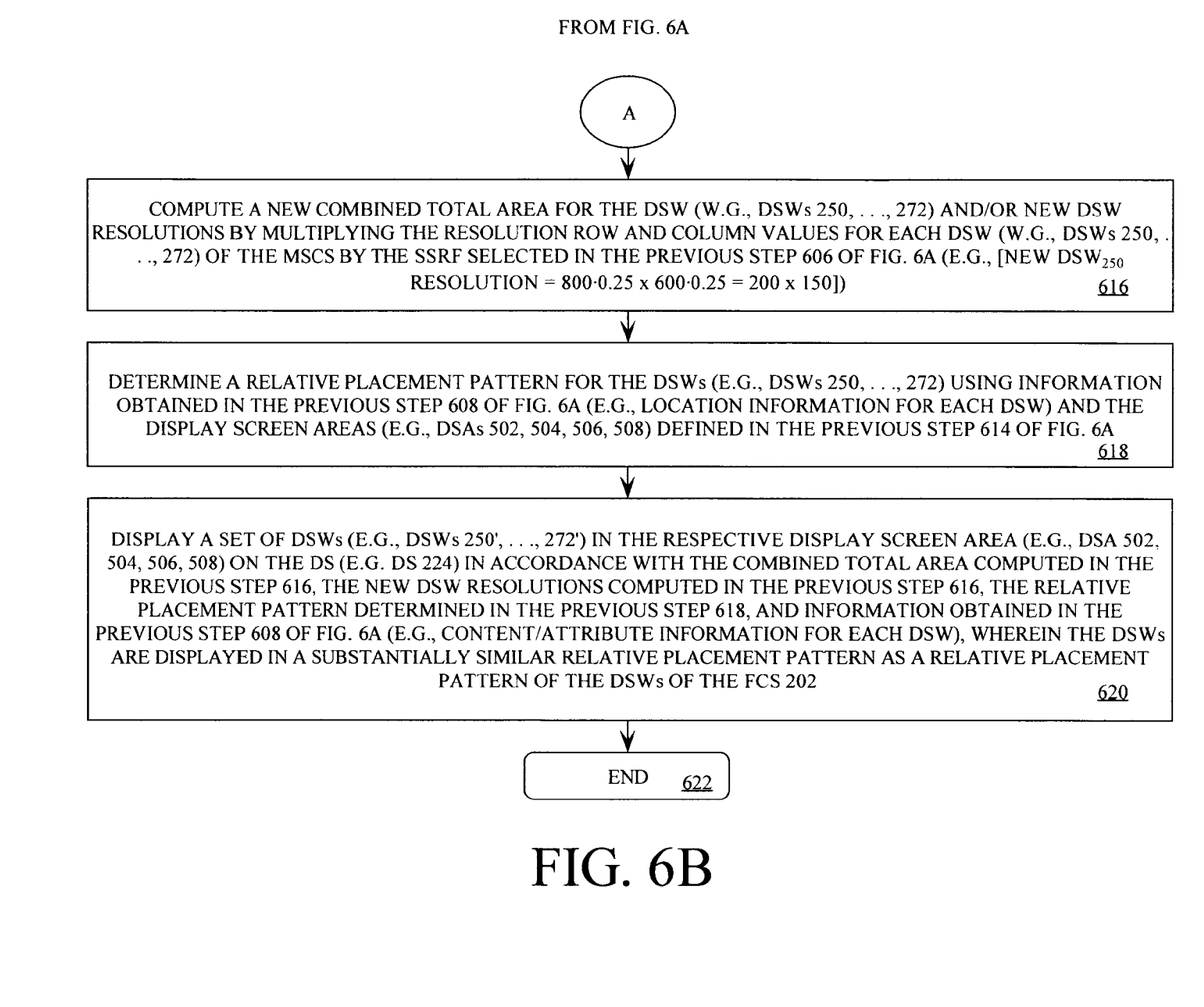

The following FIGS. 6A-6B and accompanying text illustrate a method 600 for visualizing a multi-screen workspace on a single display screen. It should be appreciated, however, that the method disclosed herein is provided for purposes of illustration only and that the present invention is not limited solely to the method shown.

Referring now to FIG. 6A, the method 600 begins at step 602 and continues with step 604. In step 604, a single-screen computing system (e.g., SCS 210 of FIG. 2) is turned on (or powered on). Thereafter, step 606 is performed where at least one screen size reduction factor (SSRF) is selected by a user (not shown) of the single-screen computing system (e.g., SCS 210). The user can select the at least one SSRF from a menu displayed on a display screen (e.g., DS 224) of the single-screen computing system. The menu can include one or more SSRFs for selection. The invention is not limited in this regard. For example, step 606 can alternatively involve automatically computing the SSRF.

As noted above, the SSRF can be a variable for use in reducing a combined total area of the DSs (e.g., DSs 234, . . . , 240) of a multi-screen workspace and/or DSWs (e.g., DSWs 250, . . . , 272) displayed on respective DSs (e.g., DSs 234, . . . , 240). The SSRF can also be used to compute new resolutions for the DSs (e.g., DSs 234, . . . , 240) of a multi-screen workspace and/or DSWs (e.g., DSWs 250, . . . , 272) displayed on respective DSs (e.g., DSs 234, . . . , 240). The variable can generally be any percentage variable, such as fifteen percent (15%), twenty-five percent (25%), fifty percent (50%), seventy-five percent (75%), and one hundred percent (100%). The invention is not limited in this regard.

As noted above, the computing system (e.g., SCS 210) can perform operations for reducing the size and/or dimensions of the DSWs in accordance with the computed total area and/or resolutions. Such operations include, but are not limited to, data compression operations. Data compression operations are well known to those having ordinary skill in the art, and therefore will not be described herein. However, it should be appreciated that such data compression operations can generally reduce the dimensions of a DSW, dimensions of content displayed in a DSW, the size of a DSW data file, the size of a content data file, and the like. Notably, the data compression operations typically maintain the integrity of the DSW and content so that the same does not appear to be stretched, to be distorted, to have less color depth, and/or to have a reduced sharpness. The invention is not limited in this regard.

After the user selects an SSRF or the SSRF is automatically computed, step 608 is performed. In step 608, the single-screen computing system (e.g., SCS 210) automatically performs actions to obtain display screen information (DSI) for a plurality of DSs (e.g., DSs 234, . . . , 240) of a multi-screen computing system (e.g., FCS 202 of FIG. 2). If the DSI is stored in a server (e.g., server 204 of FIG. 2), then the single-screen computing system (e.g., SCS 210) performs actions to communicate with the server, access a memory (e.g. memory 282) internal to the server, and obtain DSI from a display window configuration file (e.g., DWCF 280 of FIG. 2) stored in the memory (e.g. memory 282). The invention is not limited in this regard. For example, step 608 can alternatively involve obtaining DSI from a configuration file stored within an internal memory of the single-screen computing system (e.g., SCS 210).

According to an embodiment of the invention, the DSI generally includes, but is not limited to, information indicating the number of DSs of the multi-screen computing system, display screen (DS) identification information, DS area information, DS resolution information, DS location information, display screen window (DSW) identification information, DSW area information, DSW resolution information, DSW location information, DSW content information, and DSW attribute information. The invention is not limited in this regard. The DSI can include any information selected in accordance with a particular application.

In step 610, the single-screen computing system (e.g., SCS 210) computes a new combined total area of the DSs (e.g., DSs 234, . . . , 240) and/or new display screen resolutions for each DS (e.g., DSs 234, . . . , 240) of the multi-screen computing system (e.g., FCS 202). The computations performed in step 610 can generally involve using information obtained in the previous step 606. Such information can include, but is not limited to, the area information for each DS (e.g., DSs 234, . . . , 240) and the resolution information for each DS (e.g., DSs 234, . . . , 240) of the multi-screen computing system (e.g., FCS 202). The invention is not limited in this regard. For example, method 600 can be absent of step 610 and the following steps 612-614.

It should be understood that step 610 can involve multiplying resolution column and row values for each DS (e.g., DSs 234, . . . , 240) by the SSRF selected in the previous step 606. For example, if a resolution of a DS (e.g., DS 234) equals sixteen hundred columns of pixels by twelve hundred rows of pixels (1600 by 1200) and the SSRF is a percentage variable equal to twenty-five percent (25%), then the new display screen resolution computation can be defined by the following mathematical equation $NR_{DS234}=(1600 \cdot 0.25\%)$ by $(1200 \cdot 0.25\%)=400$ by $300$. The invention is not limited in this regard.

Referring again to FIG. 6A, the method 600 continues with step 612. In step 612, the single-screen computing system (e.g., SCS 210) determines a relative placement pattern for the DSs (e.g., DSs 234, . . . , 240) of the multi-screen computing system (e.g., FCS 202). For example, the relative placement pattern for the DSs 234, . . . , 240 is determined to be top left $DS_{234}$, top right $DS_{236}$, bottom left $DS_{238}$, bottom right $DS_{240}$ (same as shown in FIG. 2). The invention is not limited in this regard. The determination of step 612 can be provided using information obtained in the previous step 608. Such information can include, but is not limited to, the number of display screens of the multi-screen computing system (e.g., FCS 202) and the location information for each display screen of the multi-screen computing system (e.g., FCS 202).

After determining a relative placement pattern for the DSs (e.g., DSs 234, . . . , 240), the method 600 continues with a step 614. In step 614, the single-screen computing system (e.g., SCS 210) performs an operation to define display screen areas (e.g. DSAs 502, . . . , 508 of FIG. 5). This operation can be based on the new display screen resolutions computed in the previous step 610 and the relative placement pattern determined in the previous step 612.

For example, the single-screen computing system (e.g., SCS 210) defines a plurality of display screen areas DSAs 502, . . . , 508 as shown in FIG. 5. Each of the DSAs 502, . . . , 508 is associated with a respective display screen DSs 234, . . . , 240 of the multi-screen computing system (e.g., FCS 202). As such, DSA 502 is a top left display screen area (as shown in FIG. 5) and has a resolution equal to the new $DS_{234}$ resolution computed in the previous step 610. DSA 504 is a top right display screen area (as shown in FIG. 5) and has a resolution equal to the new $DS_{236}$ resolution computed in the previous step 610. DSA 506 is a bottom left display screen area (as shown in FIG. 5) and has a resolution equal to the new $DS_{238}$ resolution computed in the previous step 610. DSA 508 is a bottom right display screen area (as shown in FIG. 5) and a resolution equal to the new $DS_{240}$ resolution computed in the previous step 610. The invention is not limited in this regard.

Subsequent to completing step 614, the method 600 continues with a step 616 of FIG. 6B. In step 616, the single-screen computing system (e.g., SCS 210) can compute a new combined total area for the DSWs (e.g., DWs 250, . . . , 272) of the multi-screen computing system (e.g., FCS 202). The computations performed in step 616 can involve using information obtained in the previous step 606 of FIG. 6A. Such information can generally include, but is not limited to, the area and/or resolution information for each DSW (e.g., DSWs 250, . . . , 272) of the multi-screen computing system (e.g., FCS 202). The computations can also involve multiplying the SSRF by an area for each DSW or a combined area for the DSWs.

Step 616 can also involve using the SSRF selected in the previous step 606 of FIG. 6A to compute new display screen window resolutions for the DSWs (e.g., DSWs 250, 272) of the multi-screen computing system (e.g., FCS 202). The new display screen window resolutions can be computed by multiplying resolution row and column values for each DSW (e.g., DSWs 250, . . . , 272) by the SSRF selected in the previous step 606 of FIG. 6A. For example, if a resolution of a DSW (e.g., DS 250) equals eight hundred columns of pixels by six hundred rows of pixels (800 by 600) and the SSRF is a percentage variable equal to twenty-five percent (25%), then the new display screen resolution computation can be defined by the following mathematical equation $NR_{DSW250}=$ (800·0.25%) by (600·0.25%) =200 by 150. The invention is not limited in this regard.

After completing step 616, the method 600 continues with step 618. It should be noted that step 618 can alternatively be performed prior to step 616. In step 616, a determination is made by the single-screen computing system (e.g., SCS 210). The determination of step 618 generally involves determining a relative placement pattern for the display screen windows (e.g., DSWs 250, . . . , 272) of the multi-screen computing system (e.g., FCS 202). The determination of step 618 can be provided using information obtained in the previous step 608 of FIG. 6A. Such information can include, but is not limited to, the location information for each display screen window of the multi-screen computing system (e.g., FCS 202). The determination of step 618 can also be provided using the display screen areas defined in the previous step 614 of FIG. 6A.

For example, the relative placement pattern for the DSWs 250, . . . , 272 is determined to be defined by the following expression: $DSW_{250}$ top left of $DSA_{502}$, $DSW_{252}$ top right of $DSA_{502}$, $DSW_{254}$ bottom left of $DSA_{502}$, $DSW_{256}$ bottom right of $DSA_{502}$, $DSW_{258}$ top of $DSA_{504}$, $DSW_{260}$ bottom of $DSA_{504}$, $DSW_{262}$ left of $DSA_{506}$, $DSW_{264}$ right of $DSA_{506}$, $DSW_{266}$ top left of $DSA_{508}$, $DSW_{268}$ top right of $DSA_{508}$, $DSW_{270}$ bottom left of $DSA_{508}$, $DSW_{272}$ bottom right of $DSA_{508}$. The invention is not limited in this regard. For example, the relative placement pattern for the DSWs 250, . . . , 272 can alternatively be determined without using the display screen areas defined in the previous step 614 of FIG. 6A. In such a scenario, a "top left" or "upper left" DSW can be presented in a middle-left of a DS (e.g., DS 224) of the single-screen computing system (e.g., SCS 210).

After determining a relative placement pattern for the DSWs (e.g., DSWs 250, . . . , 272), the method 600 continues with a step 620. In step 620, the single-screen computing system (e.g., SCS 210) displays a set of display screen windows (e.g., DSWs 250', . . . , 272') on its display screen (e.g., DS 224) in accordance with the new DSW resolutions computed in the previous step 616 and the relative placement pattern determined in the previous step 618. In this regard, it should be appreciated that the display screen windows (e.g., DSWs 250', . . . , 272') are displayed in the same or substantially similar placement pattern as a placement pattern of the display screen window (e.g., DSWs 250, . . . , 272) of the multi-screen computing system (e.g., FCS 202).

Step 620 can also involve displaying a set of display screen windows (e.g., DSWs 250', . . . , 272') on its display screen (e.g., DS 224) in accordance with information obtained in the previous step 608 of FIG. 6A. The information can include, but is not limited to, content/attribute information for each display screen window (e.g., DSWs 250, . . . , 272) of the multi-screen computing system (e.g., FCS 202). In this regard, it should be appreciated that each of the display screen windows (e.g., DSWs 250', . . . , 272') of the single-screen computing system (e.g., SCS 210) can have the same or substantially similar content as a respective display screen window (e.g., DSW 250, . . . , or 272) of the multi-screen computing system (e.g., FCS 202). Each display screen window (e.g., DSWs 250', . . . , 272') of the single-screen computing system (e.g., SCS 210) can also have the same or substantially similar attributes as a respective display screen window (e.g., DSWs 250, . . . , 272) of the multi-screen computing system (e.g., FCS 202). For example, the DSW 250' has the same content and attributes as the DSW 250. Similarly, the DSW 252' has the same content and attributes as the DSW 252, and so on. The invention is not limited in this regard.

It should be noted that the method 600 enables a workspace developer to visualize a multi-screen workspace within a single-screen workspace. More particularly, a user can easily visualize display screen windows of a multi-screen workspace (e.g., a 2-screen workspace, a four-screen workspace, and an N-screen workspace) on a single display screen at new resolutions, dimensions, and/or size. This visualization capability enhances the ease with which one may visualize a set of displays covering multiple screens of a multi-screen workspace.

It should also be noted that method 600 can be implemented by a graphical workspace editor. Graphical workspace editors are well known to those having ordinary skill in the art, and therefore will not be described herein. It should further be noted that the implementation of method 600 requires relatively simple multiplication operations, and thus is not computationally intensive.

In light of the foregoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for visualizing on a single display screen a plurality of display screen windows displayed on a plurality of display screens of a multi-screen workspace, comprising the steps of:
    determining a first relative placement pattern for a first plurality of display screen windows displayed in a first display screen of the workspace;
    determining a second relative placement pattern for a second plurality of display screen windows displayed in a second display screen of the workspace;
    selecting at least one size reduction factor to reduce a combined total area of said first and second plurality of display screen windows to fit within a viewing area provided by said single display screen; and
    displaying said first and second plurality of display screen windows on said single display screen using said size reduction factor and said first and second relative placement patterns;
    wherein said first and second plurality of display screen windows are presented such that said first and second plurality of display screen windows having a reduced combined total area are simultaneously viewable on said single display screen according to said first and second relative placement patterns.

2. The method according to claim 1, wherein said size reduction factor is provided by a user accessible selectable menu that includes a plurality of different available view sizes.

3. The method according to claim 1, wherein said size reduction factor is a percentage variable.

4. The method according to claim 1, further comprising the steps of automatically computing said size reduction factor and using said automatically computed size reduction factor to display said first and second plurality of display screen windows on said single display screen.

5. The method according to claim 1, further comprising the step of computing a plurality of new resolutions for each display screen window of said first and second plurality of display screen windows using said size reduction factor.

6. The method according to claim 5, wherein said computing step further involves multiplying said size reduction factor by resolution column and row values for each display screen window of said first and second plurality of display screen windows.

7. The method according to claim 1, wherein each display screen window displayed in said single display screen comprises the same or similar content as a respective display screen window of said first and second plurality of display screen windows of the workspace.

8. The method according to claim 1, wherein a display screen window displayed in said single display screen comprises at least one attribute of a respective display screen window of said first and second plurality of display screen windows of the workspace.

9. The method according to claim 8, wherein said at least one attribute is selected from the group consisting of resize-ability, drag-ability, minimize-ability, maximize-ability, and close-ability.

10. The method according to claim 1, further comprising the step of reading said size reduction factor from a configuration file.

11. The method according to claim 1, further comprising the steps of reading said size reduction factor from a common location and applying said size reduction factor to at least one display screen window of said first and second plurality of display screen windows without using information of a configuration file and a multi-screen workspace configuration.

12. A system, comprising:
    a first computing system comprising a plurality of display screens of a multi-screen workspace configured for displaying a plurality of display screen windows; and
    a second computing system comprising a single display screen, said second computing system configured for (a) determining a first relative placement pattern for a first plurality of display screen windows displayed in a first display screen of the workspace, (b) determining a second relative placement pattern for a second plurality of display screen windows displayed in a second display screen of the workspace; (c) using at least one size reduction factor to reduce a combined total area of said first and second plurality of display screen windows to fit within a viewing area provided by said single display screen, and (d) displaying said first and second plurality of display screen windows on said single display screen using said size reduction factor and said first and second relative placement patterns;
    wherein said first and second plurality of display screen windows are presented such that said first and second plurality of display screen windows having a reduced combined total area are simultaneously viewable on said single display screen according to said first and second relative placement patterns.

13. The system according to claim 12, wherein said size reduction factor is provided by a user accessible selectable menu that includes a plurality of different available view sizes.

14. The system according to claim 12, wherein said size reduction factor is a percentage variable.

15. The system according to claim 12, wherein said second computing system is further configured for automatically computing said size reduction factor and using said automatically computed size reduction factor to display said first and second plurality of display screen windows on said single display screen.

16. The system according to claim 12, wherein said second computing system is further configured for computing a plurality of new resolutions for each display screen window of said first and second plurality of display screen windows using said size reduction factor.

17. The system according to claim 16, wherein said second computing system is further configured for multiplying said size reduction factor by resolution column and row values for each display screen window of said first and second plurality of display screen windows.

18. The system according to claim 12, wherein each display screen window displayed in said single display screen comprises the same or similar content as a respective display screen window of said first and second plurality of display screen windows of the workspace.

19. The system according to claim 12, wherein at least one display screen window displayed in said single display screen comprises at least one attribute of a respective display screen window of said first and second plurality of display screen windows of the workspace.

20. The system according to claim 19, wherein said at least one attribute is selected from the group consisting of resize-ability, drag-ability, minimize-ability, maximize-ability, and close-ability.

* * * * *